United States Patent [19]
Levitt et al.

[11] Patent Number: 6,061,135
[45] Date of Patent: May 9, 2000

[54] EFFICIENT SPATIAL IMAGE SEPARATOR

[75] Inventors: Hal L. Levitt, Baltimore; Dennis W. Prather, Woodbine, both of Md.; Edward T. Gill, San Jose, Calif.

[73] Assignee: The United States of America as represented by the Secretary of the Navy, Washington, D.C.

[21] Appl. No.: 09/050,960

[22] Filed: Mar. 31, 1998

[51] Int. Cl.[7] .................................................. G01B 9/02
[52] U.S. Cl. ...................... 356/354; 356/345; 250/237 G
[58] Field of Search .................................. 356/345, 356, 356/354, 353; 250/237 G

[56] References Cited

U.S. PATENT DOCUMENTS

| | | | |
|---|---|---|---|
| 4,776,701 | 10/1988 | Pettigrew | 356/356 |
| 4,806,774 | 2/1989 | Lin et al. | . |
| 5,028,102 | 7/1991 | Ogura et al. | . |
| 5,631,975 | 5/1997 | Riglet et al. | . |
| 5,666,212 | 9/1997 | Gilge | . |
| 5,682,238 | 10/1997 | Levitt et al. | . |

OTHER PUBLICATIONS

LIMO (Lissotschenko Mikrooptik), "Precision Refractive Microoptics", Nov. 1997, pp. 53–54.

Mirotznik et al., "A Hybrid Finite Element–Boundary Element Method for the Analysis of Diffractive Elements", *Journal of Modern Optics*, 1996, vol. 43, No. 7, pp. 1309–1321.

Prather et al., "Boundary Integral Methods Applied to the Analysis of Diffractive Optical Elements", *J. Opt. Soc. Am. A*, vol. 14, No. 1, Jan. 1997, pp. 34–43.

Swanson, "Binary Optics Technology: The Theory and Design of Multi–Level Diffractive Optical Elements", Massachusetts Institute of Technology, Lincoln Laboratory, Lexington, Massachusetts, Group 52, Technical Report 854, Aug. 14, 1989, pp. 1–47.

*Primary Examiner*—Robert H. Kim
*Assistant Examiner*—Andrew H. Lee
*Attorney, Agent, or Firm*—Barry A. Edelberg; Edward F. Miles; Chester Jordan, II

[57] ABSTRACT

A spatial image separator includes a separating arrangement that separates an incident image pattern into a plurality of segments. The spatial image separator additionally includes a manner of relocating and selectively recombining a set of the segments toward at least one output position. This is accomplished in a manner which preserves information content while significantly improving energy utilization.

23 Claims, 14 Drawing Sheets

TWO-BEAM INTERFERENCE PATTERN - PHOTODETECTOR CONFIGURATION

TWO-BEAM INTERFERENCE PATTERN - CONVENTIONAL PHOTODETECTOR CONFIGURATION

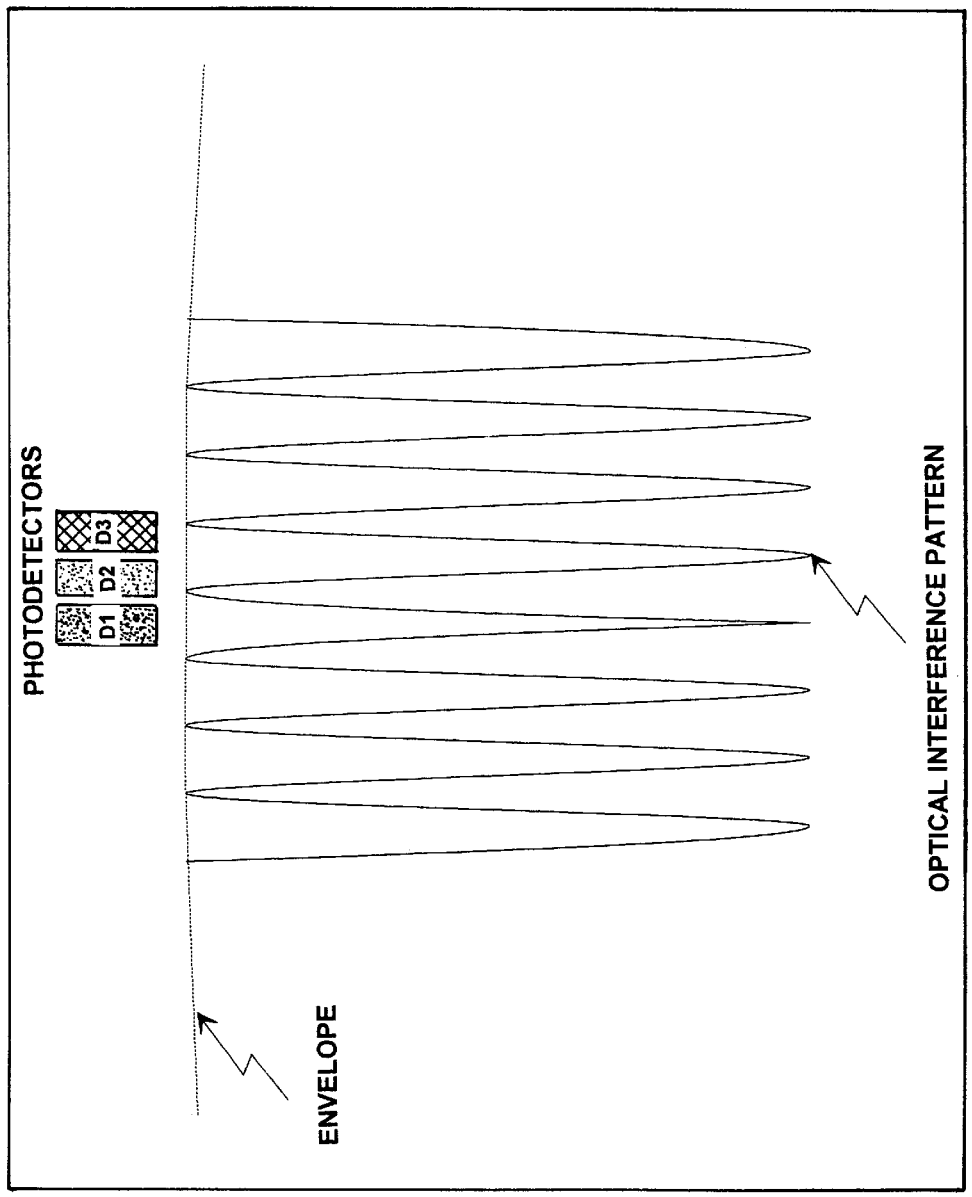

| LENSLET | f/# | FOCAL LENGTH (mm) | WINDOW (mm) | OFF-AXIS SHIFT (mm) | OFF-AXIS ANGLE (degrees) | MINIMUM FEATURE (μm) |
|---|---|---|---|---|---|---|
| LENS 1 | 14.29 | 300.0 | 3.0 | 9.0 | 1.71 | 3.00 |
| LENS 2 | 7.69 | 300.0 | 3.0 | 18.0 | 3.43 | 1.61 |
| LENS 3 | 5.26 | 300.0 | 3.0 | 27.0 | 5.14 | 1.10 |
| LENS 4 | 99.38 | 300.0 | 3.0 | 0.0 | 0.0 | 21.13 |
| LENS 5 | 14.29 | 300.0 | 3.0 | 9.0 | 1.71 | 3.00 |
| LENS 6 | 7.69 | 300.0 | 3.0 | 18.0 | 3.43 | 1.61 |
| LENS 7 | 14.29 | 300.0 | 3.0 | -9.0 | -1.71 | 3.00 |
| LENS 8 | 99.38 | 300.0 | 3.0 | 0.0 | 0.0 | 21.13 |
| LENS 9 | 14.29 | 300.0 | 3.0 | 9.0 | 1.71 | 3.00 |
| LENS 10 | 7.69 | 300.0 | 3.0 | -18.0 | -3.43 | 1.61 |
| LENS 11 | 14.29 | 300.0 | 3.0 | -9.0 | -1.71 | 3.00 |
| LENS 12 | 99.38 | 300.0 | 3.0 | 0.0 | 0.0 | 21.13 |
| LENS 13 | 5.26 | 300.0 | 3.0 | -27.0 | -5.14 | 1.10 |
| LENS 14 | 7.69 | 300.0 | 3.0 | -18.0 | -3.43 | 1.61 |
| LENS 15 | 14.29 | 300.0 | 3.0 | -9.0 | -1.71 | 3.00 |

FIG. 7

DESIGN PARAMETERS FOR 15 BY 3 ESIS

SIMULATION OF AN EIGHT-LEVEL DIFFRACTIVE LENS CORRESPONDING TO LENS 6

EFFICIENT SPATIAL IMAGE SEPARATOR

BACKGROUND OF THE INVENTION

1. Field of the Invention

The present invention is directed toward an efficient spatial image separator, and in particular, to a signal processing apparatus that separates and selectively recombines segments of an image pattern, redirecting composite beams onto photodetector elements.

2. Background

There are numerous optical applications that require efficient processing of complex image patterns. For example, optical phase measurement processors are known which accept signals from an antenna pair, and measure the electrical phase difference. For example, U.S. Pat. No. 5,682,238 to Levitt et al. (the subject matter of which is incorporated herein by reference) discloses a signal processing apparatus that provides phase difference measurements of multiple signal inputs. FIG. 1 depicts one embodiment of such a channelized phase detector. Conceptually, a coherent laser source 24 is split into two optical beams 26, 26' each illuminating an Bragg Cell optical modulator 27, 29 whose RF inputs contain a relative phase difference to be measured. The two RF-modulated optical beams interfere spatially along the phase axis at the Fourier plane. (Optical beam deflection also occurs along an orthogonal axis proportional to input frequency, but is irrelevant for the purposes of this discussion). The resultant optical interference pattern is modulated by a gaussian envelope as shown in FIG. 2. To measure spatial phase of the interference pattern, three photodetectors, D1, D2 and D3, sample within a single period of the pattern. (In the figure, photodetector placement is depicted by rectangular blocks shown directly above the pattern for reference.) However, accurate phase measurements can only be achieved under conditions of minimum envelope rolloff across the sampling region, hence the arrangement of FIG. 2 produces unacceptable results. This is because the gaussian apodization envelope distorts object spatial phase information contained in the optical interference pattern within. FIGS. 3a and 3b show one conventional approach to this problem with the interference period to gaussian envelope width relationship being controlled through design parameter changes. In this configuration, a narrow central region of the interference pattern is utilized to minimize phase measurement errors due to envelope roll-off. This will reduce signal measurement errors associated with envelope apodization, allowing for a spatially accurate signal intensity transfer. Also apparent in FIG. 3b is the low energy utilization because the photodetector capture area is a small fraction of the entire beam envelope; less than 8 percent in one actual implementation. However, reduced energy at the photodetectors disadvantageously results in a loss of system sensitivity, due to decreased signal-to-noise ratio at the photodetector outputs.

Thus, there is a need for a signal processing arrangement that will reserve information content of an image pattern, while significantly improving energy utilization.

SUMMARY OF THE INVENTION

It is, therefore, a principle object of this invention to provide a signal processing arrangement that will preserve information content of an image pattern, while significantly improving energy utilization.

It is a further object of the present invention to provide an Efficient Spatial Image Separator (ESIS) that separates and selectively recombines segments of an image pattern onto a finite number of output measurement positions.

These and other objects of the present invention are accomplished by the efficient spatial image separator disclosed herein.

According to one aspect of the invention, a spatial image separator is provided. The spatial image separator includes means for separating an incident image pattern into a plurality of segments, and means for relocating a set of the segments toward at least one output position. In one preferred embodiment, multiple input segments are recombined at each output position. This advantageously achieves a reduction in the number of output detection devices required for signal measurement. The resultant recombination of segments at each output position is additive, resulting in an improvement in sensitivity, in terms of signal-to-noise ratio. Additionally, as will be described, for a periodic input image pattern, selective recombination mitigates to a large extent the distorting effects of image apodization on output measurement accuracy.

Preferably, the means for relocating deflects a plurality of sets of the segments toward a plurality of respective output positions. Each set preferably comprises a plurality of substantially identical (or correspondingly related) segments extracted from consecutive interference (or other periodic) pattern periods, with each of the plurality of respective output positions receiving a respective set of the substantially identical segments. With such an arrangement, the means for separating may separate the incident image pattern into fifteen segments, for example, and the means for relocating may deflect three sets, for example, of the segments toward three respective output positions.

The spatial image separator preferably includes means for combining the set of the relocated segments. The means for combining may comprise a photodetector element. Alternatively, the means for combining may comprise summing electronics.

The present invention provides for a signal processing apparatus that separates and selectively recombines segments of an image pattern, redirecting the composite beams onto photodetector elements. The present invention thus permits spatial image separation of an apodized optical image pattern, and can be implemented as a precision integrated structure requiring no inter-element alignment. In a preferred embodiment, signal energy of multiple input segments is advantageously combined at each output position, effectively increasing efficiency of transfer. This improves system sensitivity by virtue of improved signal-to-noise ratio and reduces the required number of photodetector elements. Use of the invention can realize an efficiency improvement of over 10 dB (from 8% to 90% efficient), while maintaining phase measurement accuracy. This is a result of the invention's reduced sensitivity to image apodization (i.e. envelope rolloff) rolloff, permitting more complete utilization of available optical energy. The invention thus functions correctly with significant apodization, limited primarily by the quantity of segmenting elements that can be fabricated within overall device dimensions. This occurs because each resultant signal obtained at one output position, relative to another output position, includes input segment contributions from essentially equivalent apodization levels within the incident image. Efficiency is enhanced with use of the invention even in the case of non-apodized image patterns.

An additional advantage in many practical applications is increased separation between output positions that permits incorporation of individually packaged photodetector elements with reduced alignment requirements. This is advantageous in terms of system cost and performance.

BRIEF DESCRIPTION OF THE DRAWINGS

FIG. 3b is a magnified view of the central image region of the interference intensity pattern plot illustrated in FIG. 3a, showing photodetector placement within the overall modulation envelope.

FIG. 7 is a table of design parameters for the 15 by 3 ESIS shown in FIG. 5.

DETAILED DESCRIPTION

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
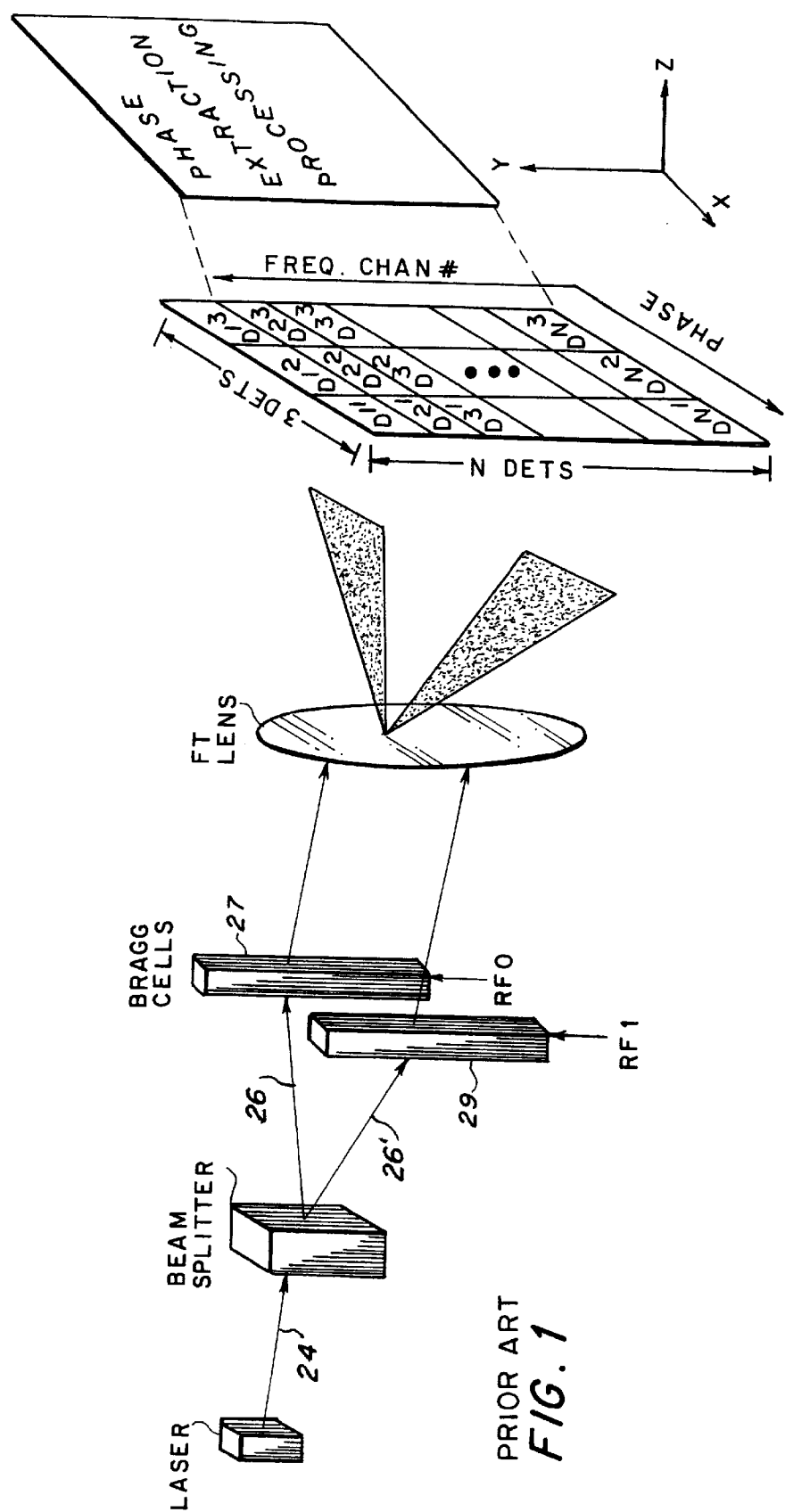
FIG. 1 is a schematic diagram of a conventional multiple phase measurement apparatus.
Figure 2:
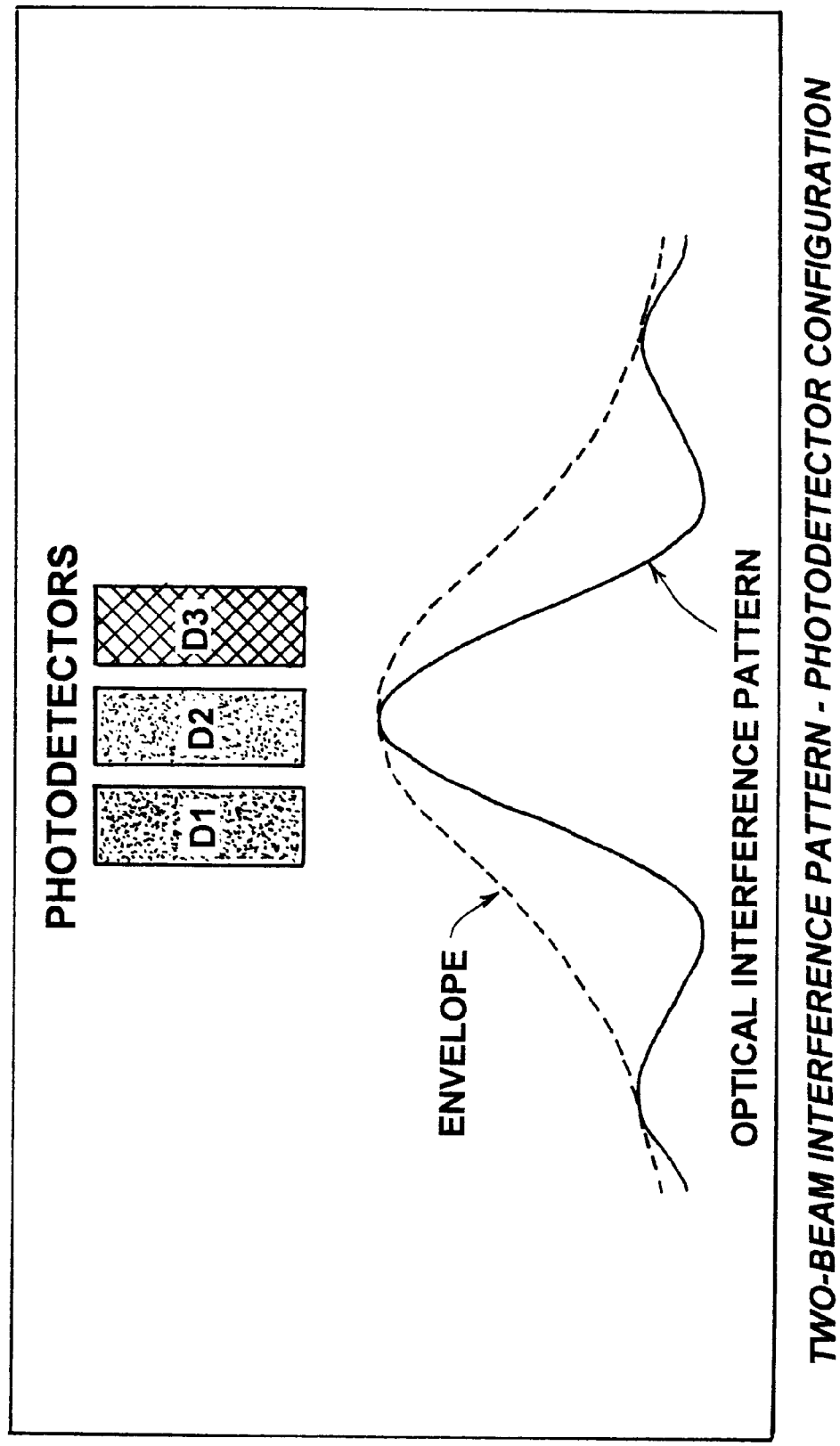
FIG. 2 shows a two-beam interference intensity pattern plot and relative photodetector placement in a conventional configuration, emphasizing the effects of gaussian envelope rolloff.
Figure 3A:
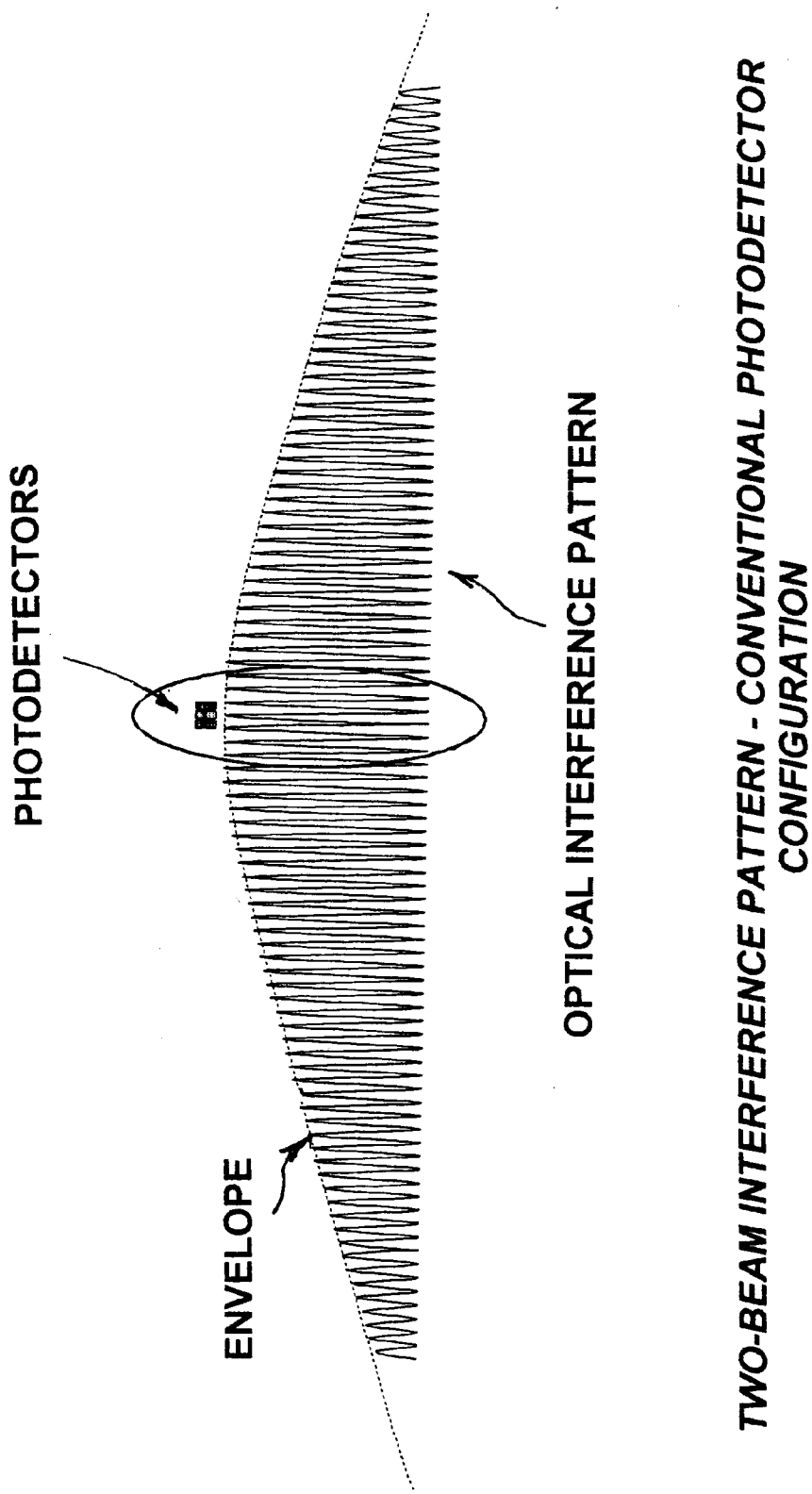
FIG. 3a shows a two-beam interference intensity pattern plot and relative photodetector placement in a conventional configuration, emphasizing low optical energy utilization.
Figure 4:
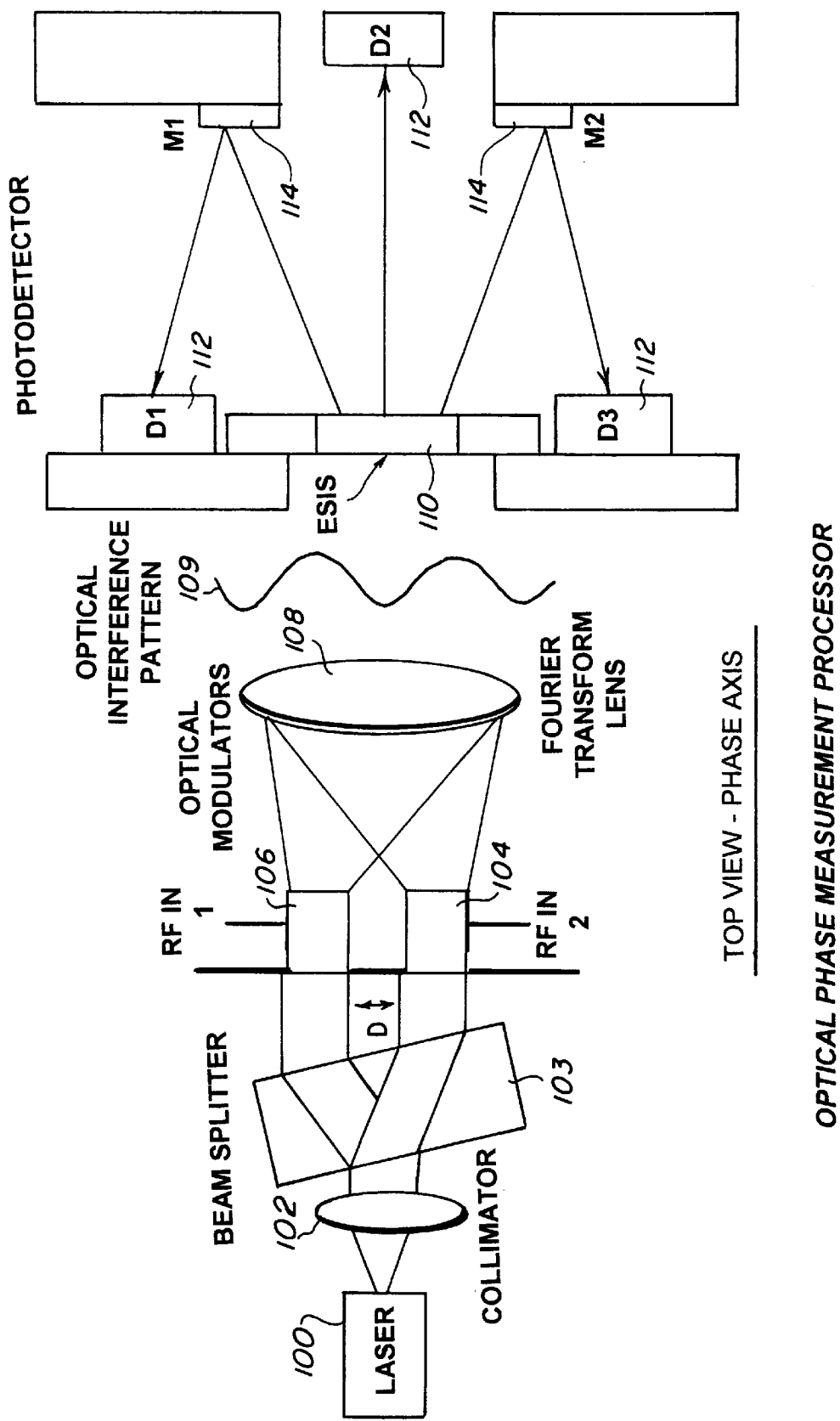
FIG. 4 shows a conceptual block diagram representation of an optical phase measurement processor utilizing the present invention.

FIG. 4 illustrates an exemplary embodiment of the invention showing the present invention used in an Optical Phase Measurement (OPM) processor. The ESIS-enhanced OPM processor provides an alternative to a custom photodetector, with the potential for increased operating speed achieved through a reduction of required elements. However, it is to be understood that the present invention is not limited to utilization within an OPM processor. To the contrary, the present invention is equally applicable to a variety of applications. For example, the present invention may be used in any optical application which requires efficient processing of complex image patterns, which may also be corrupted by envelope apodization. Such applications include optical processors embedded in communication systems, radio frequency (RF) direction finding receivers, air traffic control radar for multiple target tracking, radio frequency test equipment, optical interferometers used in surface inspections, optical multiplexers, optical encryption/decryption devices, and optical test equipment, for example.

A laser 100 is used to generate a coherent laser source with a gaussian apodization profile. Collimator 102 transforms a divergent laser wavefront into a non-divergent or planar wavefront of a defined size. Beam splitter 103 separates the planar apodized beam into two optical beams with a separation D corresponding to optical modulator separation. Each optical beam illuminates an optical modulator 104, 106 whose respective RF inputs contain a relative phase difference to be measured. The two RF-modulated optical beams interfere spatially along the phase axis at the Fourier plane and pass through Fourier Transform lens 108. A gaussian envelope modulates the resulting optical interference pattern 109.

The optical interference pattern 109 is then separated into multiple segments using an efficient spatial image separator (ESIS) 110. Spatial image separation is a means to relocate (and optionally compress) sections of an optical image pattern to arbitrary locations, for example, to accommodate photodetection and readout. In this embodiment, the ESIS 110 is an optical processing device. However, as will be explained below, the ESIS can also be implemented as a post-detection electronic processor. Regardless of the specific structure, all embodiments of the ESIS according to the present invention preserve information content while significantly improving energy utilization.

In this embodiment, the ESIS 110 processes the image pattern, and deflects the output beams toward photodetector elements 112. In particular, the ESIS 110 separates the incident image pattern into multiple segments. Sets of selected segments are deflected toward an output position (for example, the photodetectors), where they converge at a focal point, i.e., at a specified spot at the output position.

Mirrors 114 can be provided to permit beam foldback to various ones of the detectors, to reduce optical crosstalk, and provide a more compact package. The conversion of the photodetector intensity values to relative phase can be achieved using known calculations.

Figure 5:
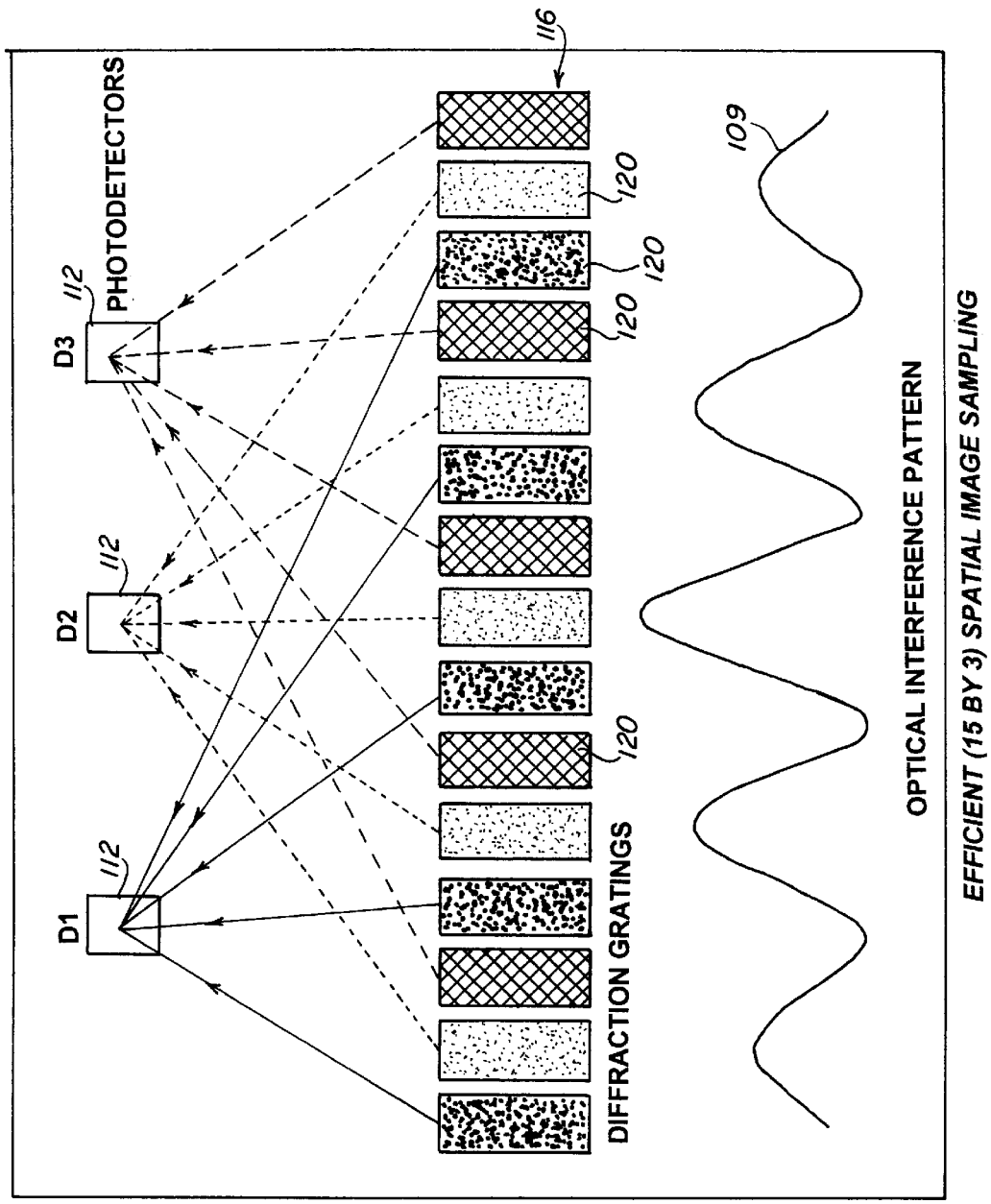
FIG. 5 shows a conceptual representation of an exemplary embodiment of a 15 by 3 efficient spatial image separator (ESIS), with lenslet placement being shown relative to an apodized two-beam interference intensity pattern, along with deflection and recombination of beams at the output photodetector positions.

Referring also to FIG. 5, an exemplary embodiment of the present invention is illustrated. In particular, this Figure illustrates the ESIS implemented as an optical processing device, and in particular, as a Diffractive Optical Element (also referred to as DOE in this text) 116. The DOE comprises a 1 by 15 off-axis lenslet array 116 arranged along a single axis to deflect and coherently combine light from five lobes (i.e., respective spatial periods) of the interference pattern onto each of three photodetector elements 112. Stated alternatively, each element 120 of the array 116 deflects light to a respective one of the three photodetector elements 112, so that each photodetector element receives light from five separate elements 120. At each photodetector element 112, each of the five respective input beams corresponds to identical spatial phase segments extracted from consecutive interference pattern periods (i.e., lobes). By redirecting multiple corresponding segments from successive spatial periods to detectors 112, optical efficiency is enhanced. Further, by directing power in the interference pattern sidelobes to the detectors 112, optical efficiency is increased while maintaining phase measurement accuracy.

In the figure, each detector 112 is associated with a segment pitch of 120 degrees spatial phase arranged in a sequential manner. However, other arrangements are possible within the spirit of the invention. Further, segment width (or duty factor) does not impact the phase calculation directly, but a high duty factor is preferable to improve energy utilization since each segment collects a larger percentage of available signal energy.

As noted above, the ESIS directs particular wavefront segments to corresponding detectors 112. As such, registration of diffractive optical element deflector segments with the optical interference pattern sinusoid to within five degrees is preferred to achieve phase measurement accuracy.

Figure 6:
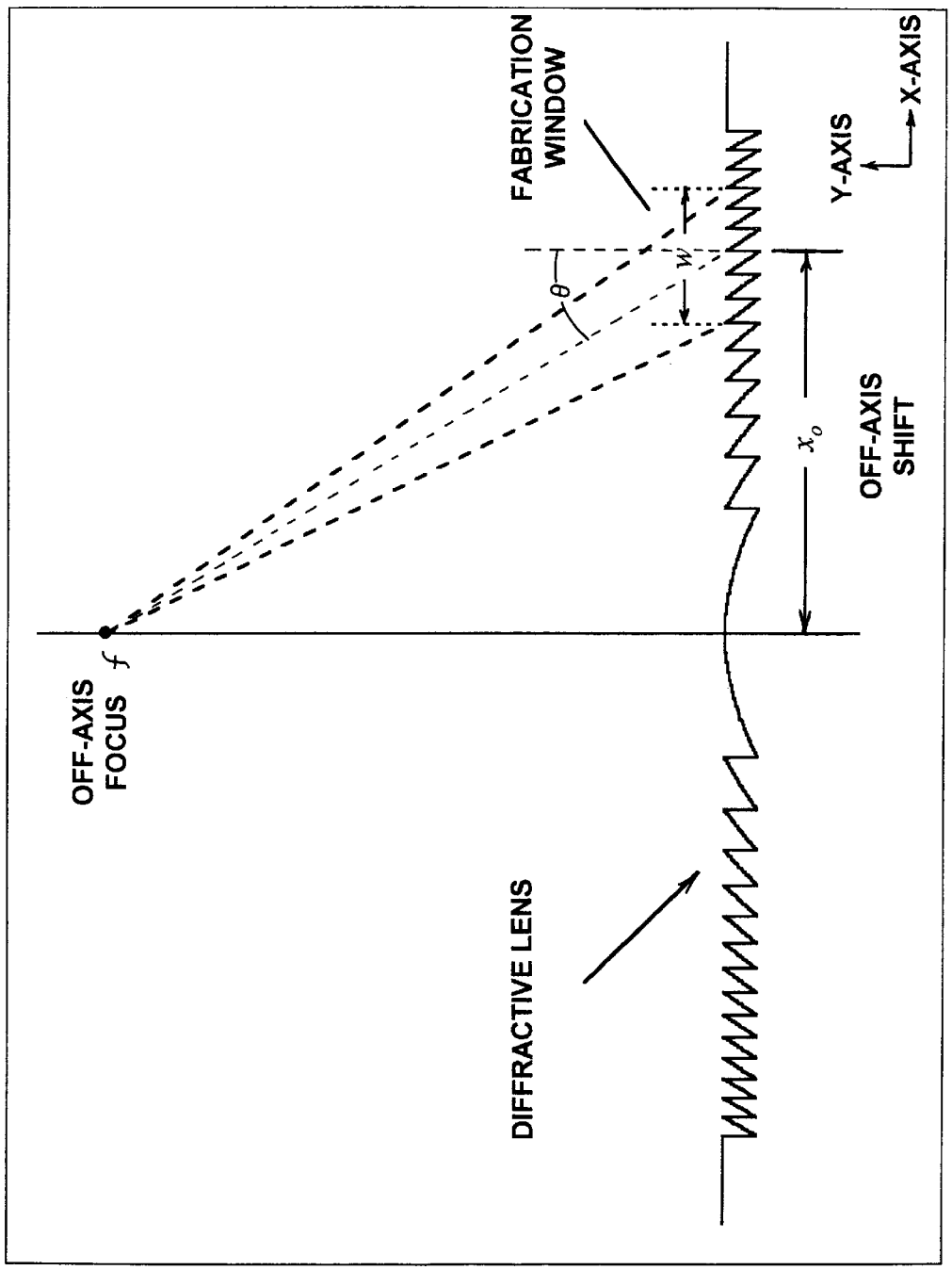
FIG. 6 is a drawing of an off-axis diffractive lens used in the embodiment shown in FIG. 5.

The off-axis lenslet array 116 may be a linear array of cylindrical lenses (i.e., elements 120), with each lens directed off-axis to a given detector 112. The off-axis focus can be achieved by creating a fabrication window within the profile of a diffractive lens, the center of which is given by $x_0$ as shown in FIG. 6. The center of the window, $x_0$, is chosen such that the center of the segmented interference pattern is focused onto one of the respective detectors 112, as shown in FIG. 5. The continuous phase profile, $\phi(x)$, within each window was determined in accordance with its off-axis shift, $x_0$, using the formula:

$$\phi(x) = \frac{2\pi}{\lambda}\left\{\sqrt{(x-x_o)^2 + f^2} - f\right\}\bigg|_{modulo\ 2\pi}$$

where f is the lenslet focal length, and $\lambda$ is the optical wavelength. Then, $x_0$ determines the off-axis angle through the formula:

$$\theta_{off-axis} = \tan^{-1}\left\{\frac{x_o}{f}\right\}.$$

One important design parameter is the maximum off-axis angle, $\theta_{max}$, which is limited by the minimum grating period, d, which can be fabricated. $\theta_{max}$ is given by:

$$\sin\theta_{max} = \frac{\lambda}{d}.$$

This expression bounds the optical design by limiting the axial distance in relation to the maximum detector spacing. For example, one approach to decreasing optical crosstalk is to increase the separation between the photodetectors 112. However, once $\theta_{off-axis} = \theta_{max}$, the focal length must be increased to further separate the detectors, resulting in a longer optical beam path length.

When $\theta_{off-axis}$ requires features to produce a grating period, d, that are on the order of one wavelength, $\lambda$, or smaller, traditional design techniques for off-axis lenses based on scalar diffraction theory are no longer valid. At this scale, electric and magnetic fields vary continuously in amplitude and orientation within the device aperture, requiring application of Maxwell's equations in vector form to solve for the design solution. This is undesirable, as the computational requirements increase significantly for complex designs. Experimental ESIS designs of the present invention as described herein, use modest $\theta_{off-axis}$ values, according to the expression for $\phi_{max}$ above, to reduce fabrication tolerances and allow for a scalar-based design.

A Diffractive Optical Element (DOE) suitable for spatial image separation may be manufactured using conventional microlithographic fabrication techniques, as employed by commercial semiconductor and DOE fabrication facilities. Utilizing existing DOE fabrication techniques allows the ESIS device to be manufactured with tight tolerances in large volumes and at a low per-unit cost. Quantity production of devices is typically accomplished through reproduction of a precision mold using low-cost optical quality plastics, or other suitable material.

Figure 8:
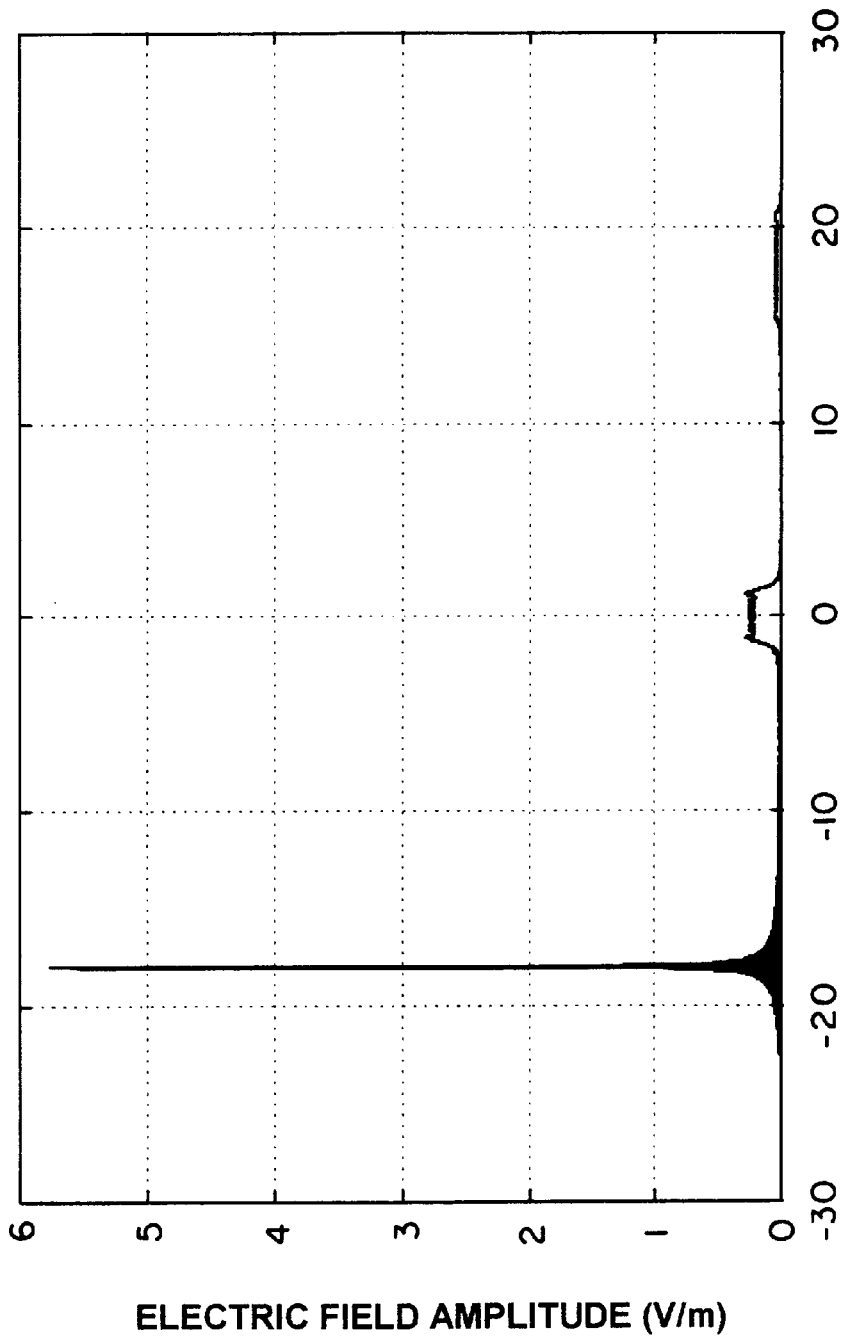
FIG. 8 is a plot of simulated performance of one lenslet of the embodiment shown in FIG. 5.

A scalar-based design of the present invention was tested by defining 5 mm fabrication windows for the 15 by 3 ESIS. Design parameters for the 15 by 3 ESIS are presented in FIG. 7. FIG. 8 shows simulation results for lens 6, presented as a detector plane spatial intensity profile. As shown, the focal point is shifted off-axis by 18 mm according to design parameters.

Measurement of optical crosstalk and coherent multiple beam summation were performed on the 15 by 3 ESIS device. Functionally, the ESIS device separates fifteen adjacent input regions and redirects optical energy from every third region onto each of the three photodetector elements 112. Multiple redirected beams are coherently combined and focused to a spot output beam at the respective photodetector. Optical crosstalk measurements were performed by plane-wave illumination of single lenslets, measuring the optical power at each output beam position. Crosstalk is optical power in undesired output beams relative to total power in all three beams; this definition isolates variations in diffraction efficiency and illumination flatness from the measurement.

Figure 9:
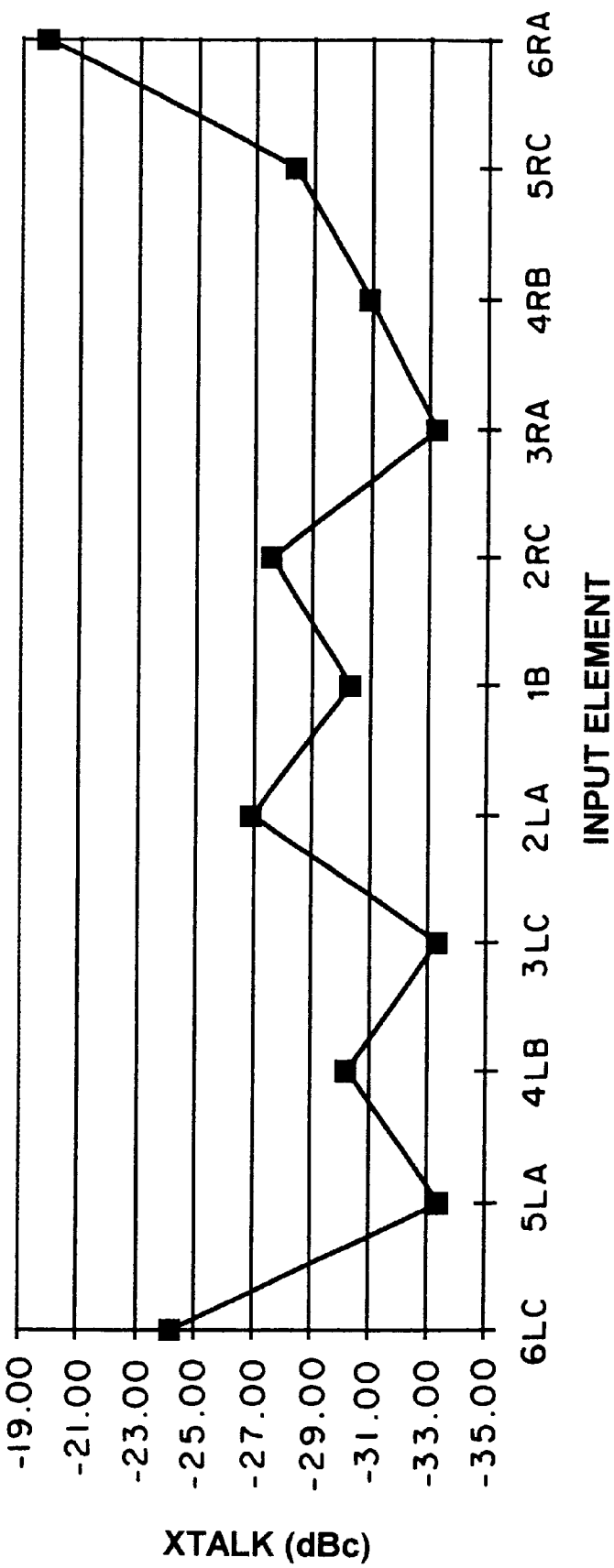
FIG. 9 is a plot of measured crosstalk performance of the embodiment shown in FIG. 5.

A graph of the measured crosstalk for the 15 by 3 ESIS is presented in FIG. 9. Optical phase measurement applications require crosstalk levels of −30 dBc or below. Given that the experimental ESIS is a binary-level device, significant improvements in diffraction efficiency and crosstalk can be expected from a multilevel device implementation since a more accurate reproduction of the analytical lens design is produced. Further, ESIS implementation using commercial DOE fabrication processes is expected to provide an overall optical efficiency of at least 90%.

Figure 10:
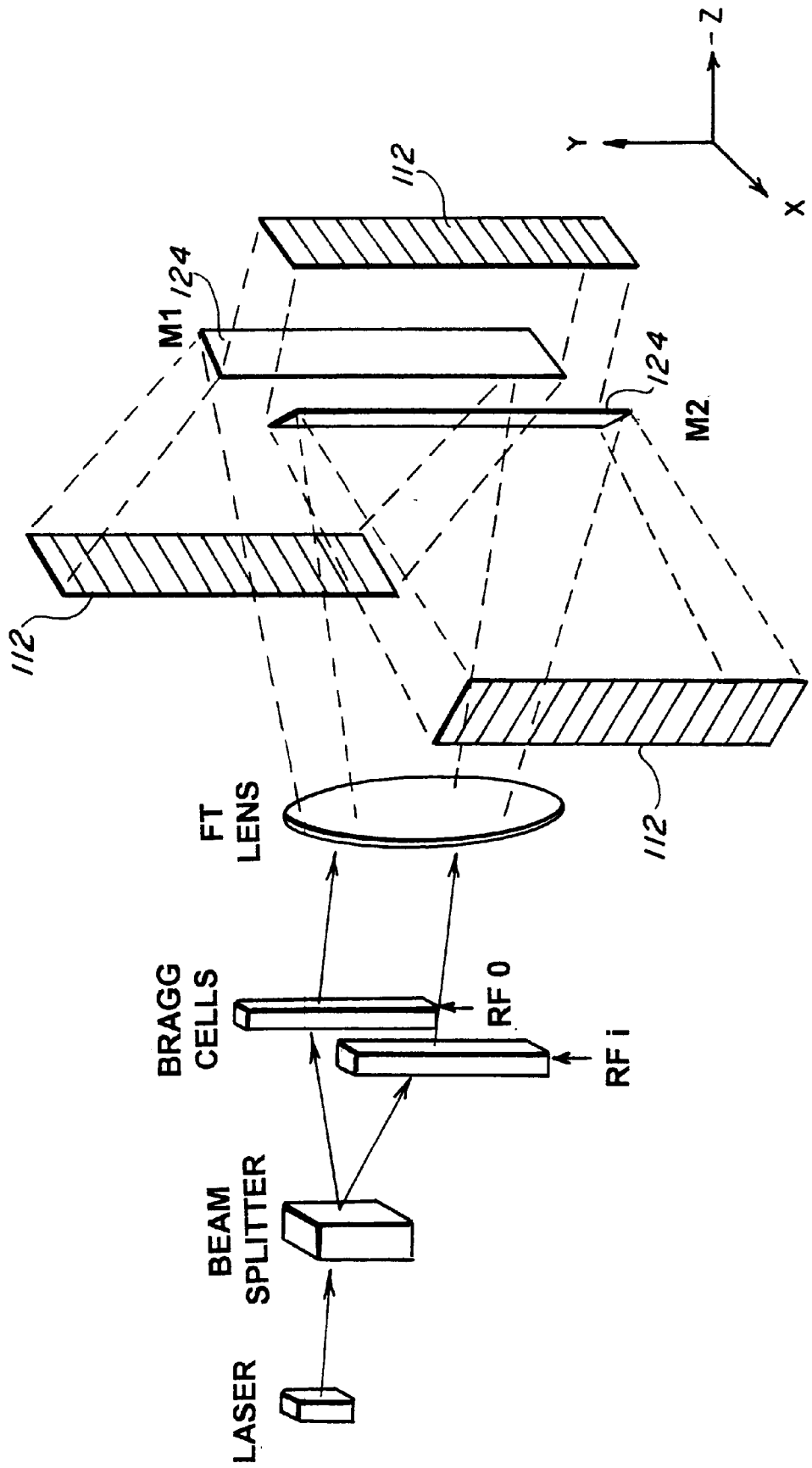
FIGS. 10–12 illustrate various alternative optical embodiments of the ESIS.
Figure 11:
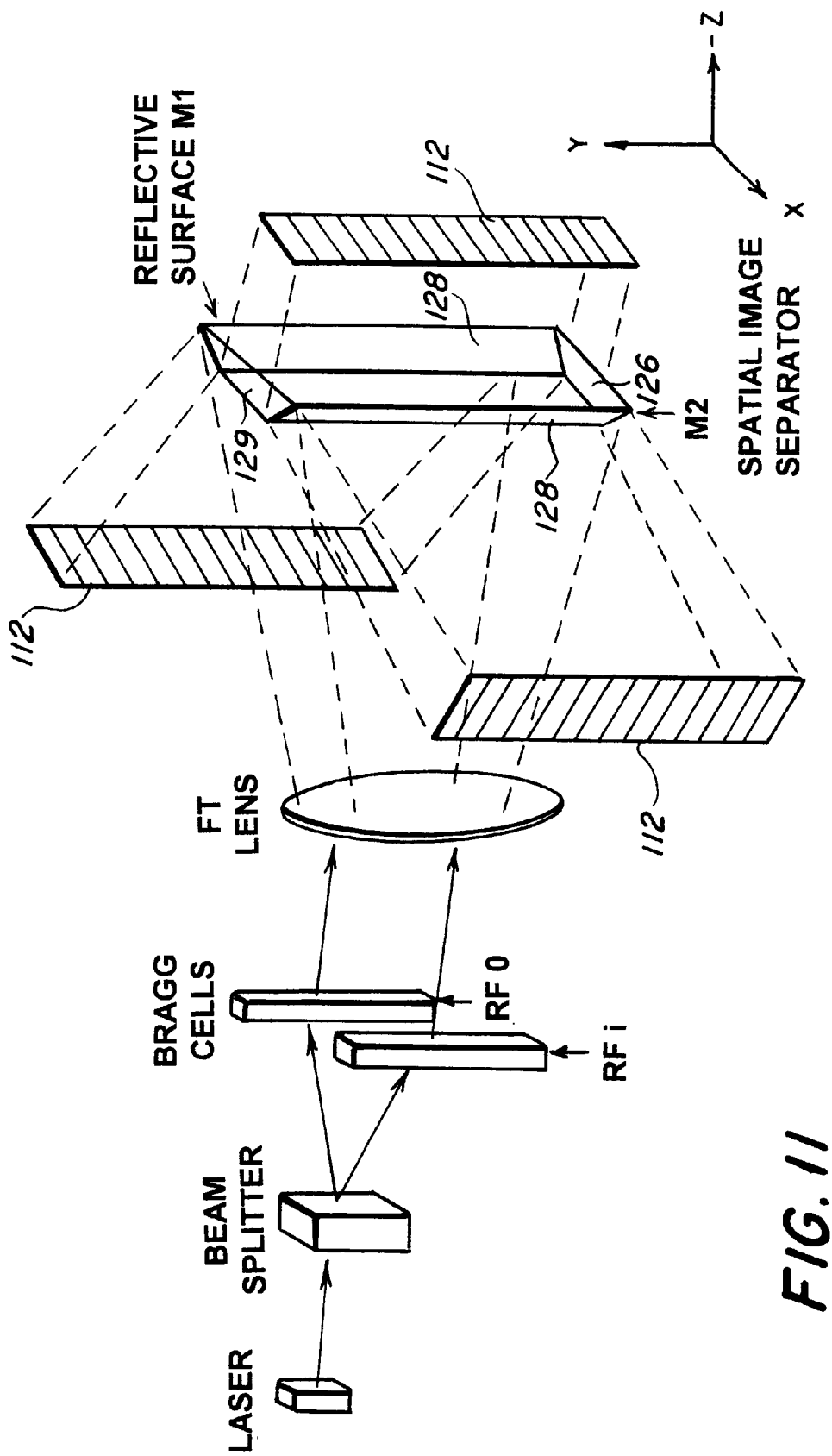

FIGS. 10 and 11 illustrate two alternative embodiments of the present invention, where the ESIS functions by reflecting light from the respective lobes of the interference pattern to the respective photodetectors 112. For example, in FIG. 10, two mirrors 124 are provided for each respective lobe, so that one beam associated with a spatial phase segment of one respective lobe is reflected by one mirror 124 to one photodetector 112, another beam associated with a spatial phase segment of the same respective lobe is reflected by another mirror 124 to another photodetector 112, and a third beam associated with a spatial phase segment of the same respective lobe is allowed to pass directly to a third photodetector 112. As will be appreciated, further mirror arrangements are preferably provided, so that beams can be extracted from consecutive interference pattern periods, so as to enhance the efficiency of the arrangement.

FIG. 11 illustrates an arrangement where the ESIS comprises a frusto-pyramidal prism 126, which has two reflective surfaces 128, which function in the same manner as mirrors 124, described above. A third surface 129 of the prism 126 allows the third beam to pass through the prism 126 to the third photodetector 112 in an unobstructed manner. Similar to the previous embodiment, multiple prisms 126 are preferably arranged adjacent to each other, so that beams can be extracted from consecutive interference pattern periods, to enhance the efficiency of the arrangement.

Figure 12:
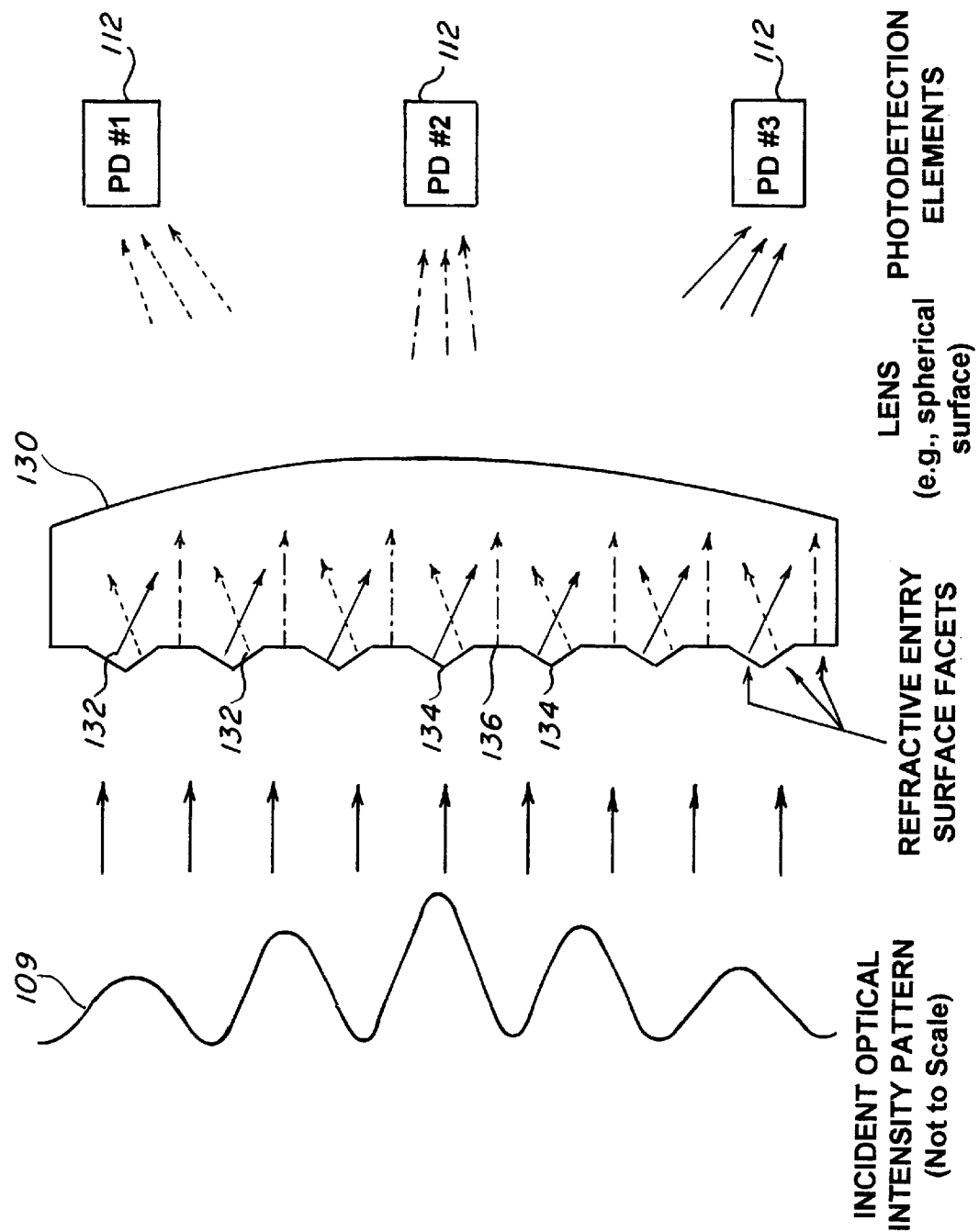

FIG. 12 illustrates an arrangement where the ESIS comprises a lens 130, which has a plurality of refractive entry surface facets 132 on its surface facing the interference pattern 109. Each refractive entry surface facets 132 refracts a beam associated with a spatial phase segment of one respective lobe to one respective photodetector 112. As shown, every two adjacent refractive entry surface facets 132 can be joined together to form a prism-shape projection 134, with each prism-shape projection 134 being separated from an adjacent prism-shape projection by a planar surface 136. The planar surfaces 136 allow a respective beam associated with a spatial phase segment of each respective lobe to pass directly to a photodetector 112 without refraction of the beam at the front entry surface.

Figure 13:
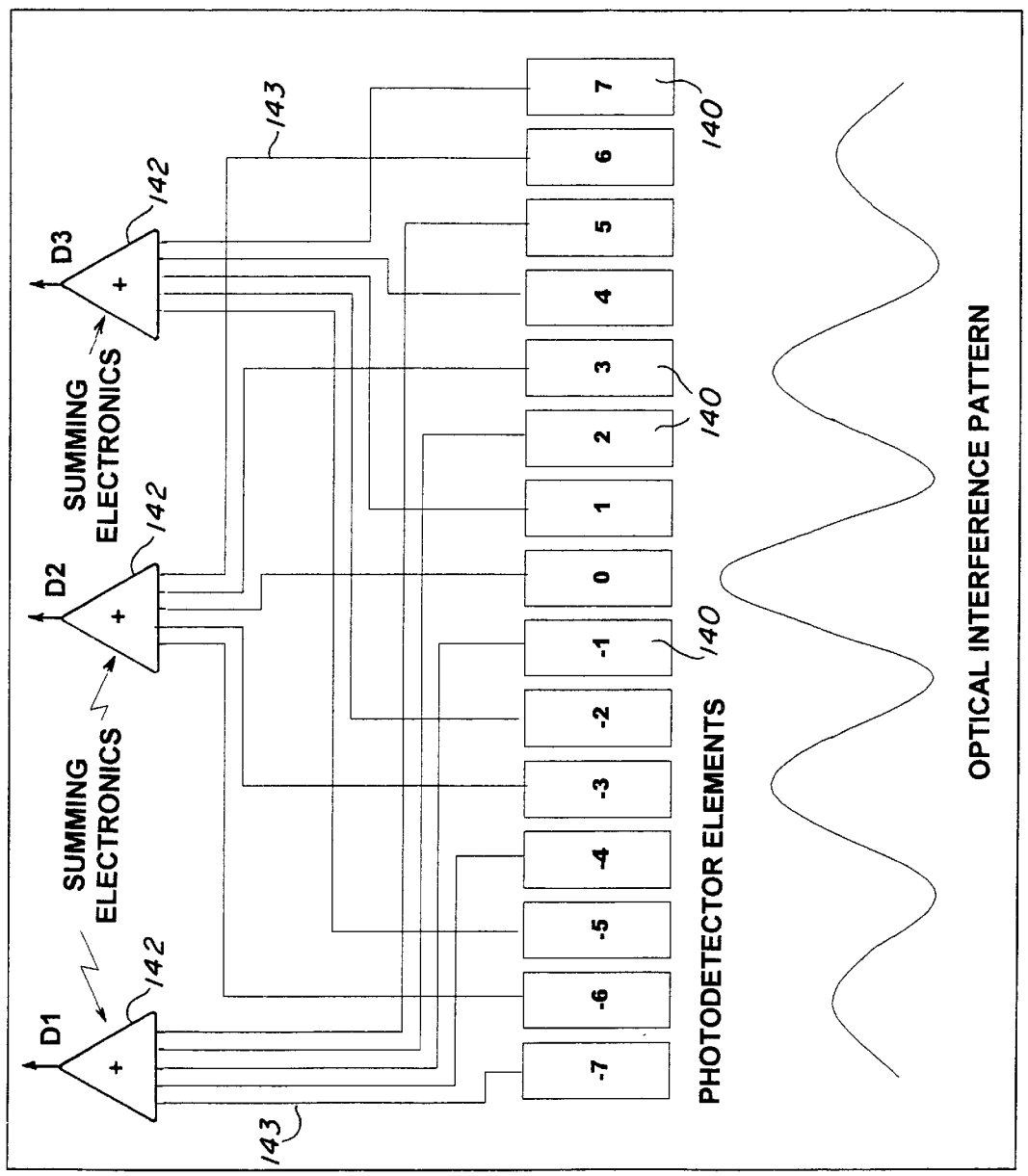
FIG. 13 is a schematic block diagram of an electronic analog embodiment of the ESIS.

FIG. 13 shows a further preferred embodiment of the invention, in which the ESIS is comprised of an electronic analog of the previously described optical devices. Referring to the figure, each DOE lenslet of the first described optical embodiment is represented by an individual photodetector element 140, with identical spacing and duty factor constraints. Electronic summing elements 142 are coupled via circuitry 143 to respective elements 140, and combine photodetector outputs of corresponding spatial phase segments, compressing the multiple inputs into a single output value. In this 15 by 3 electronic ESIS analog, the three final outputs equate to output beams at positions D1, D2, and D3 of FIG. 5. This embodiment, implemented as an integrated photodetector array-postprocessor, potentially achieves higher transfer rates due to its reduced readout requirements of three output values per readout cycle as opposed to fifteen. Summation of multiple photodetector outputs provides an overall efficiency improvement corresponding to an incoherent segment summation, as opposed to an optical ESIS embodiment producing a coherent sum of optical phase segments.

In the above described embodiments, to maximize ESIS optical efficiency and measurement accuracy, a design tradeoff exists between the number of individual separation-redirection elements and the rate of image pattern rolloff within a sampling period (i.e., lobes). In particular, if adjacent segments within one sampling period have widely differing effective envelope intensities, unacceptable measurement accuracy may result. However, individual corresponding segments from distant sampling periods with widely differing intensity levels do not corrupt the composite output, since contributions to each output are proportionally identical (or balanced). It should be apparent that a more optimal ESIS performance improvement also results in the case of non-apodized image patterns, where the above constraints do not apply.

The above invention disclosure describes a signal processing apparatus that separates and selectively recombines segments of an image pattern, redirecting the composite beams onto photodetector elements. The present invention thus permits spatial image separation of an apodized optical image pattern, and can be implemented as a precision integrated structure requiring no inter-element alignment. The ESIS functions correctly with significant apodization (i.e. envelope rolloff), limited primarily by the quantity of segmenting elements which can be fabricated within overall device dimensions. This extends achievable system sensitivity and reduces external photodetector alignment requirements; both of these results are advantageous in terms of system cost and performance. Use of the ESIS can realize an efficiency improvement of over 10 dB (from 8% to 90% efficient), while maintaining phase measurement accuracy. This is a result of the ESIS's reduced sensitivity to envelope rolloff, permitting more complete utilization of available optical energy. An ESIS performance improvement also results in the case of non-apodized image patterns.

It should be understood that the invention is not necessarily limited to the specific arrangement and components shown and described above, but may be susceptible to numerous variations within the scope of the invention. For example, although the invention has been specifically described using the aforementioned embodiments, alternative embodiments are envisioned to address varying application requirements, such as different image patterns, recombination requirements, the number of input segments, or outputs, for example.

Moreover, the ESIS apparatus is not limited to optical input (image) patterns, nor is the use of photodetector elements, or any particular transducer a requirement. Input signals may be sound, heat, light, electrical voltage, or any measurable quantity as long as the applied input signal produces a spatially varying pattern of signal amplitude which can be processed as per the invention operation. Thus, for example, RF applications of the present invention may utilize microwave, millimeter-wave, or optical spatial patterns at infrared or ultraviolet wavelengths.

Additionally, the incident image pattern need not be constrained to a single axis as depicted in the preferred embodiments, but may instead be two-dimensional (or higher), as dictated by the application functional and performance goals. Further, the number and dimensions of the input segments are arbitrary, and are selected to achieve the functional and performance goals of the application.

The output beam pattern and positions need not be constrained to a single axis as depicted in the preferred embodiments, but may instead be two-dimensional (or higher), as dictated by the application functional and performance goals. Further, the number and dimensions of the output beams are arbitrary, and are selected to achieve the functional and performance goals of the application.

Further, the input image pattern need not be periodic as described in the preferred embodiments. Moreover, the input image pattern need not be modulated by a gaussian envelope as described in the preferred embodiments. Instead, any arbitrary modulation envelope or apodization will apply, as will no envelope-apodization.

Further, although several of the described embodiments pertained to various ways in which the image segments could be deflected, other deflection means may also be used. Moreover, the deflection of the image segments is not a requirement, as long as the segments can be recombined at output locations.

The means to selectively recombine image segments for output production is non-specific. Instead, any means, including optical, electrical, or combining/summing devices, may be used.

Additionally, a single layer ESIS is not a requirement Multiple cascaded, parallel, series-parallel, or feedback configurations of ESIS devices are permitted to provide enhanced functionality or performance.

Further, the image segmentation, deflection, compression, and recombination elements of the invention are not necessarily fixed, in terms of function, but instead may be dynamically configurable.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed:

1. A spatial image separator, comprising:

means for separating an incident image pattern into a plurality of segments; and means for relocating a selected set of the segments toward at least one output position, wherein said selected set of the segments corresponds to identical spatial phase segments extracted from consecutive interference pattern periods.

2. The spatial image separator defined in claim 1, wherein said means for separating and said means for relocating comprises an off-axis diffractive lens.

3. The spatial image separator defined in claim 1, wherein said means for relocating deflects a plurality of selected sets of the segments toward a plurality of respective output positions.

4. The spatial image separator defined in claim 3, wherein each set comprises a plurality of substantially identical phase segments extracted from consecutive interference pattern periods, with each of the plurality of respective output positions receiving a respective set of the substantially identical phase segments.

5. The spatial image separator defined in claim 4, wherein said means for separating separates the incident image pattern into fifteen segments, and said means for relocating deflects three sets of the segments toward three respective output positions.

6. The spatial image separator defined in claim 1, further comprising means for combining the set of the relocated segments.

7. The spatial image separator defined in claim 6, wherein said means for combining comprises a detector element.

8. The spatial image separator defined in claim 6, wherein said means for combining comprises summing electronics.

9. The spatial image separator defined in claim 1, wherein the incident image pattern comprises an apodized two-beam interference intensity pattern.

10. The spatial image separator defined in claim 1, wherein said means for separating and said means for relocating comprises a lens having a plurality of refractive entry surface facets, each for refracting a beam associated with a respective segment toward the at least one output position.

11. The spatial image separator defined in claim 1, further comprising at least one summing element; wherein said means for separating comprises a plurality of photodetector elements, and said means for relocating comprises circuitry coupled to said summing element, said summing element combining and compressing an output of said photodetector elements into a single output value.

12. The spatial image separator defined in claim 1, wherein said means for separating and said means for relocating comprises a plurality of reflective mediums, each for reflecting a beam associated with a respective segment toward the at least one output position.

13. The spatial image separator defined in claim 1, wherein said means for relocating converges the selected set of segments to a specific point at the output position.

14. A method of separating a spatial image, comprising:

separating an incident image pattern into a plurality of segments; and relocating a set of the segments toward at least one output position, wherein said set of the segments corresponds to identical spatial phase segments extracted from consecutive interference pattern periods.

15. The method defined in claim 14, further comprising combining the set of the relocated segments at the output position.

16. The method defined in claim 14, wherein said relocating comprises refracting a beam associated with a respective segment toward the at least one output position.

17. The method defined in claim 14, wherein said relocating comprises reflecting a beam associated with a respective segment toward the at least one output position.

18. The method defined in claim 14, wherein said relocating comprises diffracting a beam associated with a respective segment toward the at least one output position.

19. The method defined in claim 14, wherein said separating comprises separating the incident image pattern into a plurality of segments using a plurality of detector elements; further comprising combining an output of said detector elements into a single output value.

20. The method defined in claim 14, wherein said separating comprises separating the incident image pattern into a plurality of sets of segments, with each set of segments being comprised of a plurality of substantially identical phase segments extracted from consecutive interference pattern periods, and said relocating comprises relocating each respective set of segments toward a respective output position.

21. The method defined in claim 14, wherein said relocating includes converging the set of segments to a specific spot at the output position.

22. A signal processor comprising:

a generator effective to produce a signal having at least one spatial frequency; and a detector disposed to receive said signal;

wherein said detector is adapted for detecting the magnitude of said signal within a plurality of spatial periods of said spatial frequency, said detecting being at three or more points within each of said plurality of spatial periods, said three or more points being of the same respective spatial phase in each of said plurality of spatial periods.

23. The processor of claim 22, wherein said detector is further adapted to coherently sum the magnitudes of said three or more points over said plurality of spatial periods.

* * * * *